(12) United States Patent
Pineda et al.

(10) Patent No.: US 12,067,762 B2
(45) Date of Patent: Aug. 20, 2024

(54) SYSTEM AND METHOD FOR THE EARLY VISUAL DETECTION OF FOREST FIRES USING A DEEP CONVOLUTIONAL NEURAL NETWORK

(71) Applicant: VOLANT AERIAL, INC., Niwot, CO (US)

(72) Inventors: Emilio J Pineda, Niwot, CO (US); Christopher Hermes, Niwot, CO (US)

( * ) Notice: Subject to any disclaimer, the term of this patent is extended or adjusted under 35 U.S.C. 154(b) by 123 days.

(21) Appl. No.: 16/723,475

(22) Filed: Dec. 20, 2019

(65) Prior Publication Data
US 2021/0192175 A1    Jun. 24, 2021

(51) Int. Cl.
| | |
|---|---|
| G06V 20/17 | (2022.01) |
| G06F 18/214 | (2023.01) |
| G06F 18/28 | (2023.01) |
| G06V 10/772 | (2022.01) |
| G06V 10/82 | (2022.01) |
| G06V 20/13 | (2022.01) |
| G06V 20/40 | (2022.01) |

(52) U.S. Cl.
CPC .......... *G06V 10/82* (2022.01); *G06F 18/214* (2023.01); *G06F 18/28* (2023.01); *G06V 10/772* (2022.01); *G06V 20/13* (2022.01); *G06V 20/17* (2022.01); *G06V 20/41* (2022.01); *G06V 20/44* (2022.01)

(58) Field of Classification Search
None
See application file for complete search history.

(56) References Cited

U.S. PATENT DOCUMENTS

| | | |
|---|---|---|
| 6,289,331 B1 | 9/2001 | Pedersen et al. |
| 8,368,757 B2 | 2/2013 | Graeser et al. |

(Continued)

FOREIGN PATENT DOCUMENTS

FR    3057781 A1    10/2021

OTHER PUBLICATIONS

Labati, Ruggero Donida, et al. "Wildfire smoke detection using computational intelligence techniques enhanced with synthetic smoke plume generation." IEEE Transactions on Systems, Man, and Cybernetics: Systems 43.4 (2013): 1003-1012. (Year: 2013).*

(Continued)

*Primary Examiner* — Sean M Conner
(74) *Attorney, Agent, or Firm* — Mariana I. Vernieri

(57) ABSTRACT

A Wildfire Early Detection System uses Aerial Video Clips of surveilled areas—obtained through a Network of Hardware components including UAVs and Tethered Aerostats equipped with a Camera and an AI-enabled Embedded Computer—and an Aerial Training Dataset, digitally combining variations of Smoke-Plume-Clips with variations of Background-Clips in nine different positions in the first frame of said Background-Clips with a relative size to the background calculated by perspective and programmed to follow the background to stay apparently "static" in the same place relative to the background for all the remaining frames of the Clip. A Computer-Vision Algorithm trained with that Aerial Training Dataset is used to recognize early fire Plumes of Smoke in those Aerial Video Clips with use of a Multiplication-free Neural Network for Wildfire detection, an AddNet based Discriminator CNN, a GANs used as both event detectors and smoke-plume scene synthesis and Block-based detection.

5 Claims, 9 Drawing Sheets

(56) References Cited

U.S. PATENT DOCUMENTS

2021/0019617 A1* 1/2021 Bang .................. G06T 7/0002
2023/0201642 A1* 6/2023 Park ................... G08B 17/125
                                                    382/103

OTHER PUBLICATIONS

Zhang, Qi-xing, et al. "Wildland forest fire smoke detection based on faster R-CNN using synthetic smoke images." Procedia engineering 211 (2018): 441-446. (Year: 2018).*
State Key Laboratory of Fire Science, University of Science and Technology of China, Hefei 230026, China, China, Deep Domain Adaptation Based Video Smoke Detection using Synthetic Smoke Images.
Department of Electronics and Information Systems Multimedia Lab, Ghent University—IBBT Gaston Crommenlaan 8, Bus 201, B-9050 Ledeberg-Ghent, Belgium, Future Directions for Video Fire Detection.

* cited by examiner

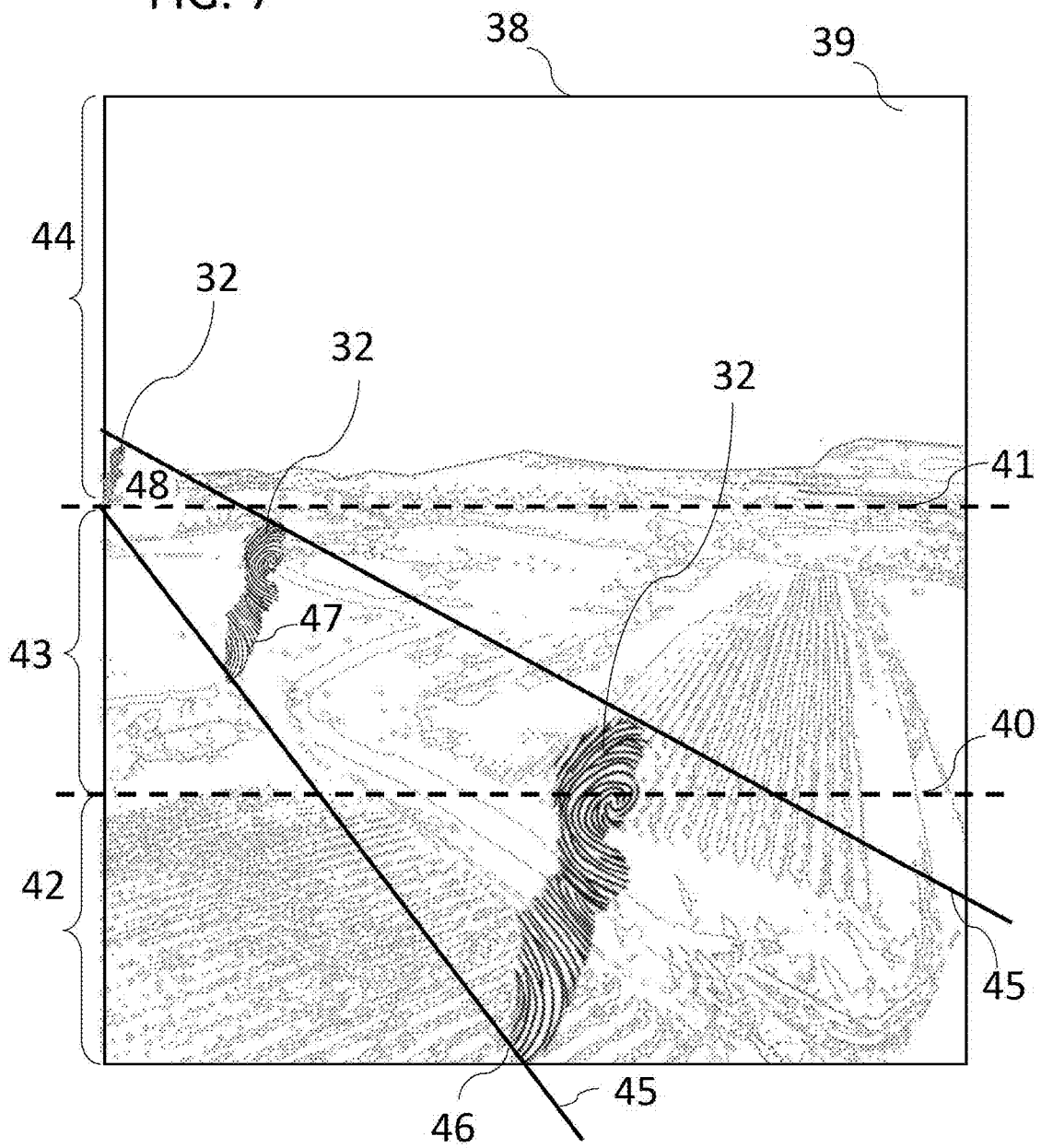

FIG. 8

| | Category | A | B | C | D | E |
|---|---|---|---|---|---|---|
| 49 | Terrain on Clip | Flat Little Trees | Flat Many Trees | Hills | Mountains | Valley |
| 50 | Wind | None | From Left | From Right | To Camera | Away Camera |
| 51 | Clouds | None, Blue Sky | White Sky | High | Medium | Low |
| 52 | Smoke Color | White | Light Grey | Mix White and Grey | Blue | Mix Blue and White |
| 53 | Plume Height | 10 meters | 25 meters | 50 meters | 100 meters | 200 meters |
| 54 | Plume Width | 5 meters | 10 meters | 20 meters | 30 meters | 40 meters |
| 55 | Height of Camera | 50m | 100m | 150m | 200m | >200m |
| 56 | Visibility | >20Km | 20Km | 10Km | 5Km | 3Km |

SYSTEM AND METHOD FOR THE EARLY VISUAL DETECTION OF FOREST FIRES USING A DEEP CONVOLUTIONAL NEURAL NETWORK

TECHNICAL FIELD

The present invention relates generally to the field of Computer Vision and, more particularly, to a deep Convolutional Neural Network image recognition Algorithm to detect Plumes of Smoke in videos supplied by a Wildfire surveillance System.

BACKGROUND OF THE INVENTION

Wildfires (forest fires) across the world have been producing an increasingly devastating impact on local economies, human life, air quality, natural resources, property value, jobs and wages. In 2018, more than 58 million Wildfires burned 8.8 million acres in the U.S. The California Camp fire alone caused $16.5 billion in damage. In 2017, the U.S. Forest Service spent almost $2.9 billion to put out fires nationwide. The loss of lives and resources due to Wildfires has been extremely high and continues to grow. The speed in which forest fires expand makes their early detection the number one priority for reducing losses, saving valuable resources and lives. The best way to reduce the costs and lives lost associated with forest fires is awareness as close as possible to the inception of a fire and to know exactly where it is located. The longest time that is elapsed from the moment a fire begins until it is detected, the hardest it will be to contain it, and this difficulty—together with the damages, costs and resources associated to it—increases exponentially with every passing hour until the fire-extinguishing resources arrive to the site of the event. Moreover, the remote unsupervised locations where forest fires usually begin, result in it usually taking many hours and days of fire growth until it is detected, and by then the damages are already extensive and considerably more difficult to contain that if it had been detected in an early stage.

From this need arose the idea of using video surveillance Cameras for monitoring such areas. These Cameras have been mounted in satellites, Towers, manned aerial vehicles and unmanned aerial vehicles (UAVs). While satellites offer an effective view of very large fires to aid in mitigation, they fall woefully short in early detection. Distance from the earth, cloud cover and lack of 24/7 coverage of a given area are all contributing factors. Camera Towers, instead, have proved to be a relatively effective methodology for early detection, but as Wildfires generally occur in remote areas where the access is difficult and there is little to no existing infrastructure, maintaining a Camera Tower in remote areas is costly, making this method inadequate for its generalized use. Besides, the Cameras are stationary, which significantly limits the ability of each location. While planes and helicopters can cover vast terrains in a short period of time, their use for Wildfire prevention is extremely expensive, therefore this method delivers only periodic monitoring and has a high incidence of human error for small fire detection. Lastly, UAVs are a much more cost-efficient method than manned flights and have proven to be extremely effective at gathering remote data for critical decision-making. However, they are still periodic and dependent on human views and evaluation.

Complementary to the use of Cameras and other Sensors for the surveillance of forest fires, detection implies the intervention of a recognizing agent, be it based on direct human observation or on artificial intelligence. While the first is highly resource-inefficient requiring a numerous working force to monitor a large area, in which, most of the time, nothing will happen, the second is still in its early stages and none of the Systems available so far for this end fulfill the need of adequately detecting early stage fires from moving platforms with precision, low error, and effective reduction of false alarms due to clouds shadows, bodies of water and fog. Of all the available alternatives for dealing with the difficulties of image recognition in the specific field of Wildfire detection, Computer Vision based in deep learning is superior to antiquated mathematical approaches, being deep Convolutional Neural Networks (DCNN) ideal for achieving superb recognition results on a wide range of Computer Vision problems.

The most salient Systems using deep learning with UAVs for forest fire detection are described on these three papers hereby incorporated by reference: "An Adaptive Threshold Deep Learning Method for Fire and Smoke Detection", published in 2017, "Saliency Detection and Deep Learning-Based Wildfire Identification in UAV Imagery", published in 2018, and "A Deep Learning Based Forest Fire Detection Approach Using UAV and YOLOv3", published in 2019. Even if these references describe interesting approaches, they still require the use of expensive hardware and software which could be drastically reduced with a novel approach involving transfer learning. Besides, none of them addresses the important issue of reducing power consumption, crucial if pursuing the autonomation of the UAVs. To adhere to the requirements of remote, resource constrained locations, a solution will need to quickly and efficiently process its visual Sensor data onboard. With state-of-the-art processors of sensory data are based on Deep Neural Networks, which are computationally expensive. They require GPU (Graphics Processing Unit) processing and, thus, consume a lot of power. Moreover, all of the current existing Systems that divide the frames in Blocks for fire detection are only capable of getting high accuracy if the Smoke exists at the center of the frames, but if the Smoke happens at the edge, their accuracy will decrease rapidly.

For these reasons, we believe that providing a comprehensive System that makes use of autonomous UAVs, Cameras on Towers or on any platform and which effectively processes the aerial videos supplied by them on a deep Convolutional Neural Network using a transfer learning image recognition Algorithm to detect Plumes of Smoke and flames, and which is at the same time capable of detecting the Smoke with a high degree of accuracy even if it exists near the edge of the frame, would substantially reduce the hardware and software requirements for early forest fire detection while incrementing the efficiency and reducing the false alarms when compared to the methods available today, therefore constituting the solution to a long felt unresolved need and substantially advancing the field.

SUMMARY OF THE INVENTION

The main object of the present invention is to provide an effective Wildfire Early Detection System, based on an extremely precise, yet computationally efficient AI based software solution for the early visual detection of forest fires capable of working on various types of fixed and moving platforms, and in particular on autonomous UAVs.

A Wildfire Early Detection System in accordance with the present invention, is achieved by combining some or all of the following aspects:

1) A network of hardware components, including some or all of the following components: (a) Drones; (b) Aerostats (in particular Tethered Aerostats); (c) Towers; (d) Manned Aircraft;
   where some or all of these components are equipped with some or all of the following technologies: (a) RGB, Near Infrared (Night Vision) and/or thermal Cameras; (b) 360 Field of View; (c) Autopilot; (d) IoT Sensors; (e) Edge nodes; (f) Embedded computers (particularly Graphic Based Embedded Computers); (g) GPS+IMU Triangulation; (h) IP Video Transmission; and
   where the network works continuously 24/7, not requiring an operator, and the autonomation of the tethered aerostats is achieved thanks to Low Power Consumption (20 W to 60 W) which allow them to be powered by small solar panels.

2) A central web application and cloud platform to manage the data and alerts.

3) A Wireless-Communication protocol to deliver streams of data in real time from the network components of point 1 to the internet of point 2 via a Mesh network.

4) An AI enabled image recognition System for automated video detection of forest fires running on the Embedded Computer of point 1, which constantly monitors the videos provided by the network of point 1 for Plumes of Smoke and flames, combining some or all of the following aspects:
   (a) Real Time AI Performance;
   (b) Aerial Training Dataset, created with the use of digitally simulated Plumes of Smoke for Video Clips having different configurations of terrains, Wind, Clouds, Smoke Color, Plume Height, Plume Width, Height of Camera and Visibility. In them, various types of Plumes of Smoke are inserted into various points of view in different combinations to generate hundreds of thousands of clips representing different possible real-life scenarios;
   (c) Transfer leaning (fine-tuning a well-trained network which is designed for a much more complex task), so that only the parameters of dense layers need to be trained;
   (d) Fine-tuned Convolutional Neural Network, like Goggle's MobileNet V2, whose energy consumption is much smaller than other Neural Networks;
   (e) Block-based detection, to easily detect the Smoke even if it exists near the edge of the frame, achieved by dividing the frame in many Blocks, and detecting the Smoke by Block in such a way that a detection unit exists at every part of the frame, even at the edge, where the Blocks are divided with overlapping (like right half of one Block overlaps with the left half of its right neighbor Block, and upper half of one Block overlaps with the bottom half of its bottom neighbor Block), so if the Smoke happens at the edge of one Block, it will also exist at the center of its neighbor Block, guaranteeing that the Smoke will not be missed;
   (f) Additive GAN-type Discriminator Network classifying regular wilderness images from Wildfire images, designed with the use of a Multiplierless Operator performing convolutions using binary weights; and
   (g) Binary Neural Network Operator to replace the multiplication Operator in Neural Networks, by mimicking the role of multiplications so that operations similar to correlations could be analogously defined.

Furthermore, a Wildfire Early Detection System in accordance with the present invention offers additional advantages when compared to its predecessors, these advantages including but not limited to: (a) Automatic sending of real time alerts to authorities when fire is detected, (b) Auto Rotation of Cameras, (c) Auto Detection and Alerts of System Failures, (d) System Redundancies to Bypass Failures, (e) Auto Detection and Filling of Helium, (f) Automated Weather Monitoring, (g) Automated Lowering and Raising of Aerostat, (h) Automated Component Monitoring, (i) Comprehensive and Intuitive interface that can merge with existing Systems or be used standalone, (j) Scalability with the System being capable of integrating weather APIs, IoT Sensors and data from other sources to become a full solution, and (k) Combining Both Near Infrared (Night Vision) and Thermal (IR) Imaging Provides More Precision at Night.

BRIEF DESCRIPTION OF THE DRAWINGS

FIG. 7 is a schematic representation of an aerial Video Clip digitally edited with Plumes of Smoke in three different possible ranges of distance, for their use in training a model for an embodiment of an AI enabled image recognition System for automated video detection of forest fires, in accordance with the present invention.

FIG. 8 depicts an example of a spreadsheet with possible combinations of Plumes of Smoke and landscape characteristics for its use in training a model for an embodiment of an AI enabled image recognition System for automated video detection of forest fires, in accordance with the present invention.

DETAILED DESCRIPTION AND BEST MODE OF IMPLEMENTATION

Figure 1:
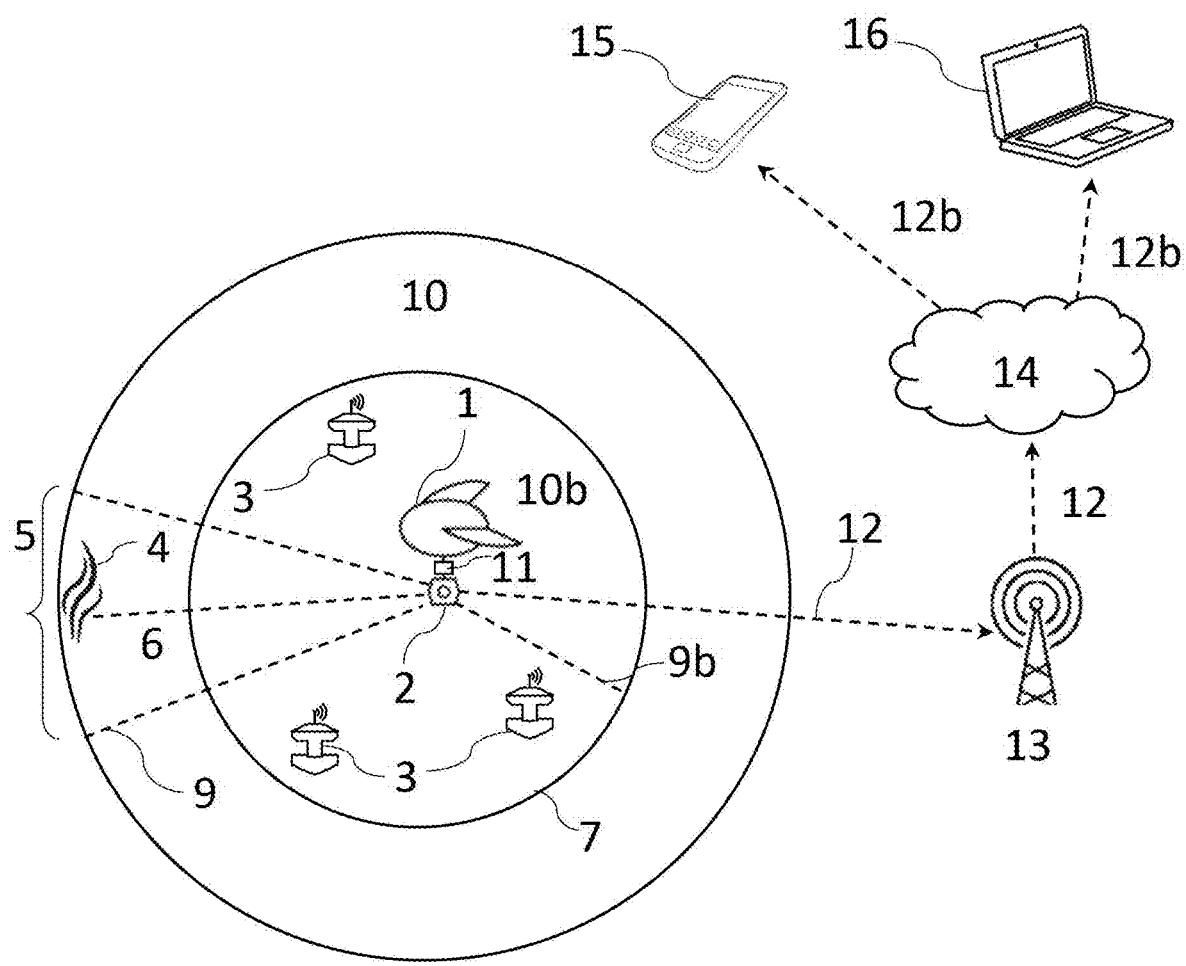
FIG. 1 is a schematic view of an embodiment of a Wildfire Early Detection System in accordance with the present invention.

Disclosed is a Wildfire Early Detection System, based on to a deep Convolutional Neural Network image recognition Algorithm to detect Plumes of Smoke in videos supplied by a Wildfire Surveillance System working on various types of fixed and moving platforms, and in particular on autonomous UAVs. The System is an intelligent, 24/7 aerial monitoring solution that combines technology from drones, Computer Vision and IoT (or Internet of Things). It is comprised of a network of autonomously operating hardware components, including drones, Aerostats and Towers armed with high-powered RGB and thermal Cameras positioned in strategic vantage points. It also includes aerial and Ground Sensors that monitor a multitude of additional variables. The AI (Artificial Intelligence) software controls the ecosystem of constant inputs and provides smarter solutions for numerous applications, including; forest fire early detection, security, crop analysis, construction monitoring, workforce monitoring, inventory management, port monitoring, wildlife management, natural disaster monitoring and much more. While the System is fully autonomous, it can be accessed and controlled from anywhere in the world with an Internet connection, dramatically reducing its cost of operation.

A Wildfire Early Detection System in accordance with the design, materials and methods here disclosed, accomplishes the goal of automatically detecting incipient fires in remote rural areas, before they expand to a level of major power of destruction, without the need of human supervisor of the System. For this goal to be achieved, the System comprises three major subsystems, that, interacting together as here described, are capable of achieving the desired goal. These subsystems are:

1) A Hardware Network.

This network includes the physical components needed to remotely monitor the forest or rural area to be protected from the spreading of potential Wildfires, by capturing Aerial Video Clips of the surveyed area. Focus is placed in achieving the autonomy of these physical components thanks to the use of low energy-consuming devices, solar energy to power them, and self-recharging strategies. The network includes not only physical-only components (like UAVs, Towers, vehicles and structures capable of providing physical support to the System), but it also includes data-processing components capable of capturing information (including visual information) from the monitored area, storing this information, distributing it and otherwise processing it. As used in this Specification and the appended claims, the term "data-processing components" refers to Cameras, Sensors, processors, IoT devices, computers and any other apparatuses that have both a physical support and the capability of digitally capturing and/or processing data.

For their nature, these devices are considered both part of the hardware network and the software network. Some non-limiting examples of devices and setups that can be used for achieving this goal will be detailed in the corresponding section of the present Specification.

2) A Software Network:

This network organizes the flow of information between the data-processing components of the Hardware Network and a central web application and cloud platform in real time, to manage the data obtained from the Cameras and Sensors in the Hardware Network and communicate with the AI System in such a way that the digital videos captured by the Cameras are provided as inputs to the AI System, which immediately proceeds analyze them and, if a fire is detected, alerts are generated and the Software Network is in charge of communicating this alert to the corresponding users, for them to take proper action. Some non-limiting examples of devices and setups that can be used for achieving this goal will be detailed in the corresponding section of the present Specification.

3) An AI System:

This System uses artificial intelligence to recognize flames and Plumes of Smoke in the Aerial Video Clips of the surveyed area provided by the Cameras of the Hardware Network through the Software Network. It constantly monitors these videos in real time to ensure the earliest possible recognition. For achieving this, the System is trained through an Aerial Training Dataset, created with the use of digitally simulated Plumes of Smoke for Video Clips having different configurations of terrains, Wind, Clouds, Smoke Color, Plume Height, Plume Width, Height of Camera and Visibility. In them, various types of Plumes of Smoke are inserted into various points of view in different combinations to generate hundreds of thousands of clips representing different possible real-life scenarios. Furthermore, the System utilizes Transfer leaning, a fine-tuned Convolutional Neural Network, and Block-based detection, an additive GAN-type Discriminator Network classifying regular wilderness images from Wildfire images, designed with the use of a Multiplierless Operator performing convolutions using binary weights, and a Binary Neural Network Operator to replace the multiplication Operator in Neural Networks, by mimicking the role of multiplications so that operations similar to correlations could be analogously defined. More information and non-limiting examples of how such a System can be implemented will be detailed in the corresponding section of the present Specification.

Some general aspects of the present invention have been summarized so far in the first part of this this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures and functional details disclosed herein are not to be interpreted as limiting. Instead, the intended function of this disclosure is to exemplify some of the ways—including the presently preferred ways—in which the invention, as defined by the claims, can be enabled for a Person of Ordinary Skill in the Art. Therefore, the intent of the present disclosure is to cover all variations encompassed within the Spirit and Scope of the invention as defined by the appended claims, and any reasonable equivalents thereof.

The Hardware and Software Networks

Referring to the drawings in more detail, FIG. 1 schematically illustrates a setup of the Hardware Network components of an embodiment of this Wildfire Early Detection System, and the flow of information between them. An Aerostat 1, having a Camera 2 attached to it, is deployed to the area desired to be monitored. The Camera is mounted to the Aerostat through a solid Camera mount and uses Gimbal gyroscopic stabilization. In other embodiments, this Camera 2, which can be a thermal or RGB Camera, and have 30× zoom, can be attached to other Hardware Components in addition to or instead of an Aerostat 1, as will be detailed in FIG. 2. Some suitable examples of Cameras 2 are Sony FCB-EV7520 (FCBEV7520) 30× Zoom and Axis Communications P5635-E Mk II. IoT Sensors 3 are also placed in different points of the area, to maximize the coverage. The IoT Sensors 3 constantly feed the System with strategically relevant datapoints that enable prediction and decision making. If a fire 4 starts within the Camera 2's field-of-view 5, the Camera 2 detects it. Any fire 4 occurring inside the Small-Area 7, defined by a circle with center in the Camera 2 and a diameter defined by the maximum-thermal-coverage 9b of that specific Camera 2, when this Camera 2 is a Thermal Camera, can be detected by it, while any fire occurring inside the Large-Area 8, defined by a circle with center in the Camera 2 and a diameter defined by the maximum-visual-coverage 9 of that specific Camera 2, is within the Range-of-Visual-Plume-Smoke-Detection 10 when this Camera 2 is an RGB Camera, and/or within the Range-of-Thermal-Plume-Smoke-Detection 10b when this Camera 2 is a Thermal Camera, and therefore its image and/or temperature are susceptible of being captured by them. The distance-to-the-fire 6, for the fire 4 to be detected, must be comprehended within the Range-of-Plume-Smoke-Detection 10 of the Camera 2. This is taken in consideration to define an adequate number, type and location of Hardware Components having Cameras 2 that enables the full coverage to the monitored area. For example, Aerostats like the ones described below in the corresponding section of this Specification, cover large amounts of terrain from 300 ft above, of approximately 25 km or 15 miles. A network of five such Aerostats monitoring Plumes of Smoke can cover 2800 square miles under ideal conditions.

The Aerial Video Clips obtained from Camera 2 are constantly monitored at the edge, by an AI-Enabled-Embedded-Computer 11, which can be, for example, NVIDIA TX2 or NVIDA Nano, integrated with or connected to the Camera 2 so that the image information captured by the Camera 2 can be analyzed in the AI-Enabled-Embedded-Computer 11 by using the AI System hereby disclosed. With this System, it is able to recognize the fire 4 and generate an alert. Said alert is sent through a Wireless-Communication Mesh network (12) though a Relay-Communication-Equipment 13, which forwards it, also wirelessly (12) to the Cloud 14. From the Cloud 14, the alert goes, through the internet (12b), to a mobile device 15 and/or to a PC 16, or any other end device in which the user can access to the information about the fire 4 detected in their monitored areas.

Figure 2:
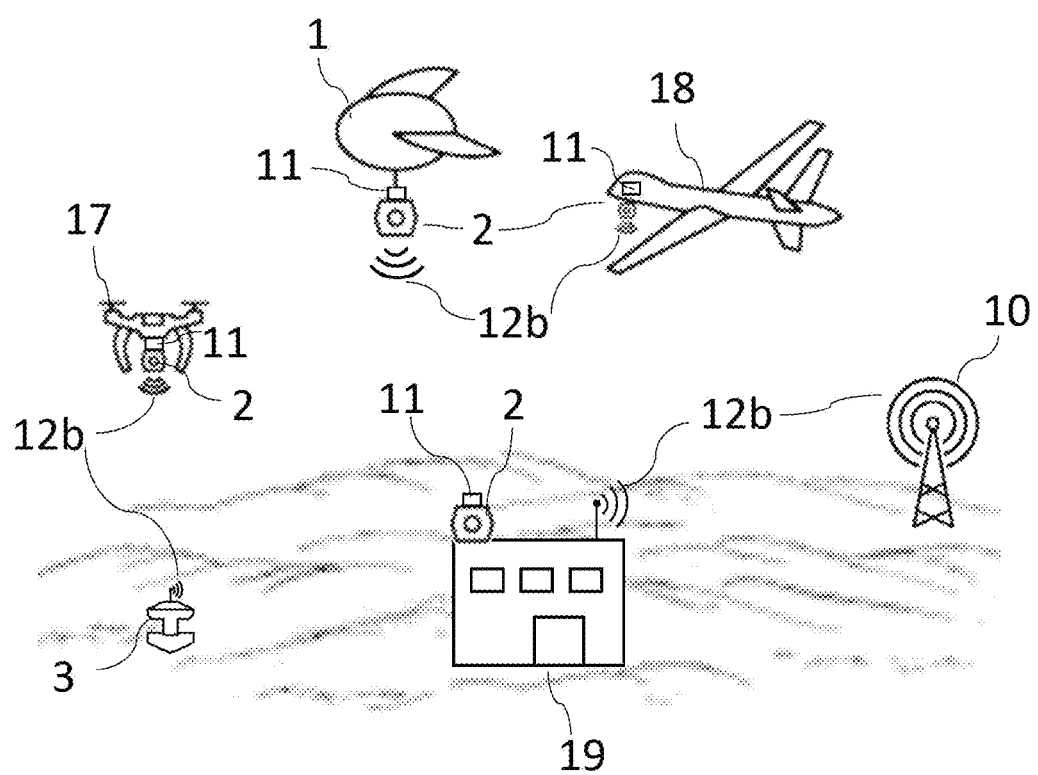
FIG. 2 is a schematic view of an embodiment a network of hardware components in accordance with the present invention.
Figure 3A:
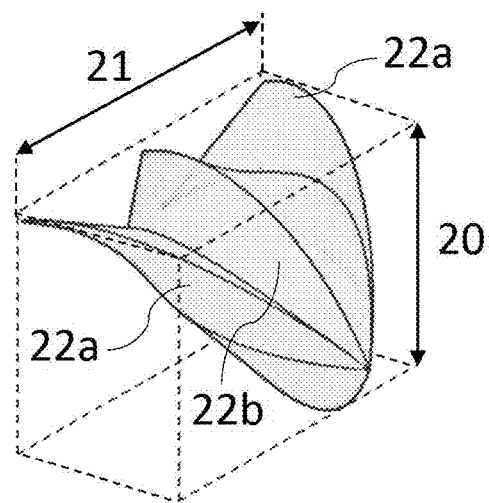
FIG. 3A is a perspective view of an embodiment of a Tethered Aerostat in accordance with the present invention.
Figure 3B:
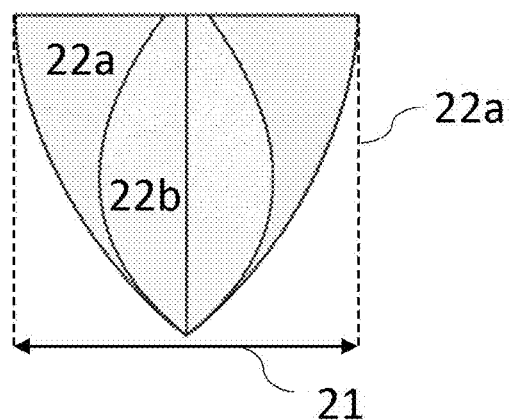
FIG. 3B is a top view of the Tethered Aerostat of FIG. 3A.
Figure 3C:
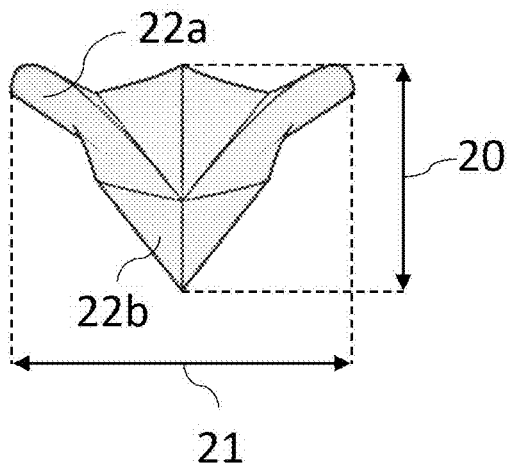
FIG. 3C is a front view of the Tethered Aerostat of FIG. 3A.
Figure 3D:
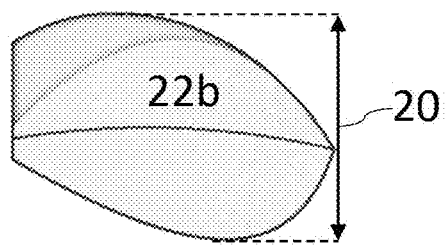
FIG. 3D is a side view of the Tethered Aerostat of FIG. 3A.

FIG. 2 illustrates the Hardware Network components of an embodiment of this Wildfire Early Detection System. This network includes an Aerostat 1 having a Camera 2, an AI-Enabled-Embedded-Computer 11 and Wireless-Communication-Capabilities 12b. Tethered Aerostats are an excellent monitoring platform, ideal for flatter terrains. They offer large area coverage and are capable of working 24/7. However, payloads need to be as light as possible. One Camera on a rotating gimbal is light enough for an 8×6 ft Aerostat. An IoT Sensor 3 and a Relay-Communication-Equipment 13, both equipped with Wireless-Communication-Capabilities 12b, are also components of this Hardware Network. These IoT Sensors 3 are lightweight and powerful, ideal for performing precise measurements. They are capable of detecting land movements, water levels, pressure, and other key variables. They are powered by small solar panels and transfer the information wirelessly to the network. Wildfires generally occur in remote areas where access is difficult and there is little to no existing infrastructure. This represents a challenge since Building new infrastructure can be costly. Therefore, the Sensor System developed is easily deployable in a multitude of platforms that range from UAVs to Towers to Manned Aircraft. The Sensors, motorized mount and onboard processing unit should to be as lightweight as possible, achieving:

(a) Low Cost;
(b) Light-Weight;
(c) Fast Deployment;
(d) Low Power Consumption;
(e) Image Stabilization; and
(f) 30× Zoom An UAV 17, also having a Camera 2, an AI-Enabled-Embedded-Computer 11 and Wireless-Communication-Capabilities 12b, is another component of this Hardware Network. This UAV can be a Tethered drone, ideal for emergency use due to its high mobility and fast deployment. The AI System disclosed in the present Specification will function fully on the moving platform and since it is at the edge, it will be light enough as well. Suitable drones for this purpose are multirotor or fixed wing UAVs that are equipped with a camera and gimbal for image stabilizations, for example, the DJI Phantom 4 Pro with 4K capabilities and 60 fps or the Matrice 210 RTK for greatest accuracy.

Another component of the Hardware Network is a Manned Aircraft 18, equally equipped with a Camera 2, an AI-Enabled-Embedded-Computer 11 and Wireless-Communication-Capabilities 12b, enabling vast amounts of terrain to be viewed, while dramatically reducing human error. Yet another component of the Hardware Network in this embodiment is a Fixed-Infrastructure-Installation 19 that can be, for example, a Building or Mast, and can be either built especially for this purpose or be preexisting installations, now repurposed for working together with the rest of the components of this Hardware Network by providing it with a Camera 2, an AI-Enabled-Embedded-Computer 11 and Wireless-Communication-Capabilities 12b. A Mast Outpost is ideal for varied terrain and positioned at higher elevations. They are also able to withstand more extreme weather conditions. One continuously moving Camera can replace up to four static Cameras in a Tower or Building. Operators will be able to manually control Cameras whenever necessary for emergency or other situation without impacting the capabilities of the software.

FIGS. 3A to 3D show a Tethered Aerostat with important advantages to be used as a part of the Wildfire Early Detection System here disclosed. This Aerostat has an airfoil shape that stabilizes the different axes (Roll, Pitch, Yaw) and hold a specified position, and having a lift vs drag ratio that tends to infinity (Having very small drag compared to the lift->r=Lift/Drag) so that the angle of the Tether and ground is closer to 90 deg. The Balloon is made of PVC and filed with Helium. The Balloon size is small, to minimize the footprint on the ground station, to make the System portable (easier to deploy), and to optimize the consumption of Helium. The area to volume ratio is decreased to avoid adding more weight from the skin (+payload=+Lifting gas volume). The lifting capacity (buoyancy) of the Aerostat is considered to the 50% as a security factor to make the Aerostat more stable (increasing the lift to drag ratio). The maximum Area to Volume ratio of the Aerostat should be of 3.5 $m^2/m^3$. For example, with the model depicted by FIGS. 3A to 3D, having a height 20 of 4091.3 mm and a width 21 of 4364 mm, its volume would be of 12.17 $m^3$ and an its Area of 38.79 $m^2$, which means that the Area to Volume ratio is of 3.19 m²/m³, thus falling within the allowable limits. Furthermore, the proportional volume of the wings 22a compared to the volume of the main body 22b, is less than 15%, keeping the design close to the shape of a sphere and without losing stability. The Aerostat is equipped with a Camera and an AI-Enabled-Embedded-Computer and attached tether that holds the aerostat and transmits power and data which can be controlled from a web app. The Camera functions can also be controlled from the web app and embedded computer. To be able to work autonomically 24/7, the Cameras and embedded computer are powered by solar panels, and the Helium must be refilled when its pressure is naturally lost with time. To be able to do this while the Aerostat is on the air, techniques similar to those used to accomplish Air Refueling are used, for replenishing the Balloon with Helium without needing human intervention, except when the helium cylinder needs to be refilled.

Figure 4A:
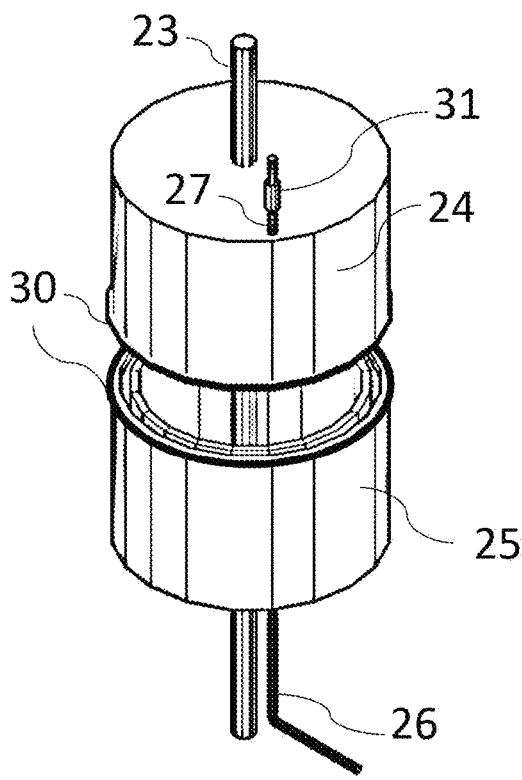
FIG. 4A is a perspective view an embodiment of an Automatic Helium Filling Valve in accordance with the present invention.
Figure 4B:
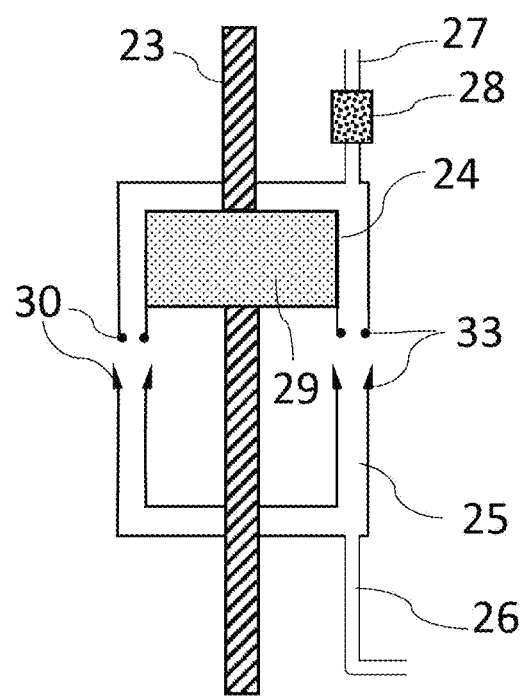
FIG. 4B is a schematic front sectional view of the Automatic Helium Filling Valve of FIG. 4A, when open.
Figure 4C:
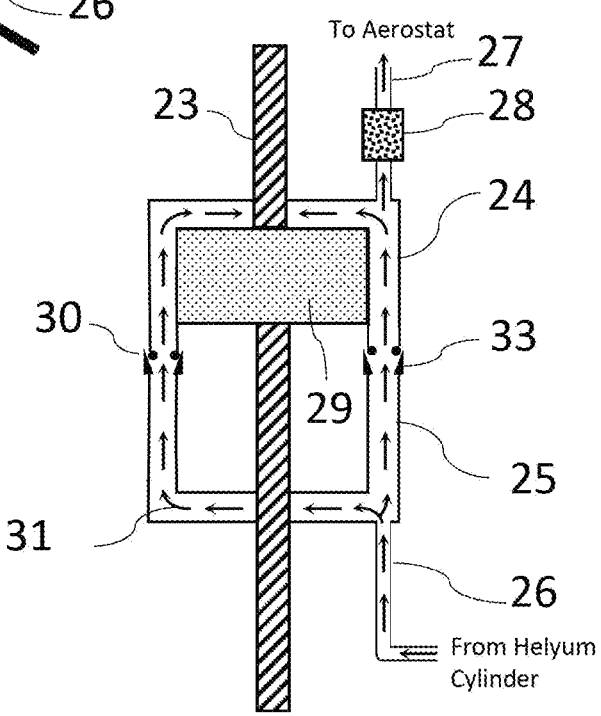
FIG. 4C is a is a schematic front sectional view of the Automatic Helium Filling Valve of FIG. 4A, when closed, in which the Helium flow throughout the Valve is depicted.

FIG. 4A depicts an Automatic Helium Filling Valve used to refill the Aerostat with Helium while on the air, in case of low pressure. The Valve is lightweight and inspired by Air Refueling, although, as will be shown below, its design and functionality substantially differ from the state of the art. The figure shows a Tether 23, an Upper-Ring 24 acting as a male connector, which is attached to the Tether in such a way that it allows the passage of Helium from the Valve to the Aerostat through the Upper-Pipe 27. A Non-Return-Valve 28 is added to the Upper-Pipe 27 to prevent the gas from flowing in the wrong direction. An adequate Valve for this purpose would be a Beler 8 mm ¼ Plastic One Way Inline Check Valve Non-Return Fit For Fuel Diesel Gas Liquid Air. The other half of the Valve is a Lower-Ring 25, acting a female connector, that is attached to the ground unit containing the helium cylinder. The Lower-Ring 25 has a lower pipe 26 which connects it to the Helium Cylinder. An adequate type of pipes to be used for the lower pipe 26 and the Upper-Pipe 27, to facilitate respectively the entrance and exit of Helium to and from the Valve, are, for example, Pneumatic Polyurethane PU Hose Tube Pipes. When the Upper-Ring 24 and the Lower-Ring 25 are connected together, they are sealed by a Rubber-Seal 30 to make sure there are no leaks FIG. 4B schematically represents a front section view of the Valve, when open, in which its interior components can be seen. The Slip Ring and Swivel 29 allow the Tether and power cables to spin freely and not twist the tether. The Helium-Flow 31 is shown in FIG. 4C, which represents the Valve when closed. In it, Helium coming from a Helium Cylinder enters the Valve through the lower pipe 26 into the Lower-Ring 25. Helium then naturally flows in upward direction passing to the Upper-Ring 24 without leakages thanks to the Rubber-Seal 30 protecting the union between the Upper-Ring 24 and the Lower-Ring 25 against any Helium leakage. Helium next exits the Valve towards the Aerostat, though the Upper-Pipe 27 which has a Non-Return-Valve 28 to prevent the gas from flowing in the wrong direction. A suitable Helium Cylinder to be used is a 60-cu ft Aluminum Helium Cylinder with CGA580 Valve. Two Cylinders should be installed in the Ground unit, so that when one runs out of Helium it can be easily swapped for the other and refilled or replaced. A Two-Cylinder Valve splitter can be added to easily change the Cylinder to be used. A Helium Cylinder Pressure Sensor that monitors the pressure inside the Helium Cylinder is required to warn the maintenance personnel when to refill.

The Dataset

An AI (Artificial Intelligence) System is provided in order to detect Plumes of Smoke in the Aerial Video Clips of the surveilled areas, provided by the Hardware and Software Networks of the previous sections of this Specification. A Plume of Smoke, as used in this Specification and the appended claims, is a large quantity of Smoke that rises into the air in a column. To accurately detect it, an Aerial Training Dataset is created with digitally generated moving images (videos) of Plumes of Smoke, hereinafter called "Smoke-Plume-Clips". At the same time, Aerial Video Clips of the surveilled areas, provided by the Cameras in the Hardware Network from the previous section will be used for the creation of this Dataset, and hereinafter called "Background-Clips". The resulting combination of Background-Clips with Smoke-Plume-Clips digitally added to them as per the Specifications detailed below will be called "Training-Clips". A Video Clip, as used in this Specification and the appended claims, is a sequence of frames, being these frames individual pictures in a sequence of images, creating the appearance of motion. The types of Video Clips (or "Clips") referred to in this specification and Claims are: (1) Aerial Video Clips of the surveilled areas, (2) Smoke-Plume-Clips, (3) Background-Clips and (4) Training-Clips. All of these Clips, even if they can be presented in varied formats, are composed of frames, including a first frame and a sequence of remaining frames.

The Dataset is focused on early fire Plumes of Smoke. These are generally white or bluish due to the water content of the plants and rise from the ground up. It is important to understand that the Camera might be panning or tilting, thus affecting the Background-Clips, so this section will explain the location where the fire should start on the Training-Clips. This means that by the end of the Training-Clip, the Plume of Smoke could be in another position relative to the screen. The goal of this methodology is to mimic real Plumes of Smoke with CGI and insert them into the moving footage Background-Clips to create a unique training Dataset, extremely useful in the context of the AI System here disclosed. Additionally, video data of real Wildfires can be obtained from Government Offices and used as Complementary-Training-Videos. For example, video data of Wildfires that occurred in Turkey in 2018 can be obtained from the Turkish Ministry of Agriculture and Forestry. Publicly available footage of fires posted online in the recent years can also be used as Complementary-Training-Videos. CGI generated Training-Clips that combine aerial video from UAVs as Background-Clips and special effects for Smoke-Plume-Clips can also be used. A Dataset generated in accordance with the following guidelines will resemble a real fire as much a possible considering, size, color, direction, weather, clouds, blur and light conditions.

Figure 5:
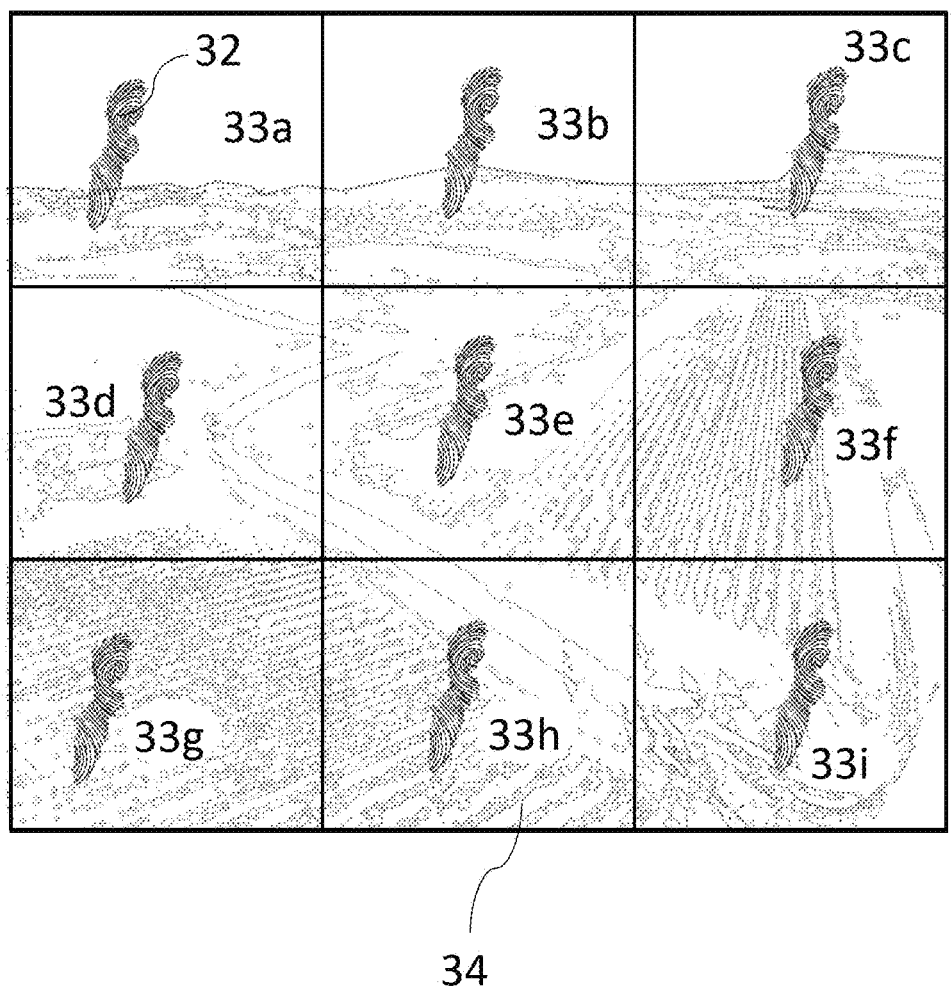
FIG. 5 is a schematic representation of an aerial Video Clip digitally edited with Plumes of Smoke in nine different positions, for their use in training a model for an embodiment of an AI enabled image recognition System for automated video detection of forest fires, in accordance with the present invention.

FIG. 5 shows a representation of a Background-Clip 34, divided in nine equally sized positions with a 3×3 grid, therefore defining nine Spaces (33a to 33i). In each one of those Spaces, Smoke-Plume-Clips 32 are digitally added at the beginning of each Background-Clip 34 to generate the Training-Clips for Dataset. The Smoke-Plume-Clip 32 is programmed to follow the background to stay in the same relative position respect of it when it is displaced with respect to the screen as per the non-static nature of Aerial Footage.

Figure 6:
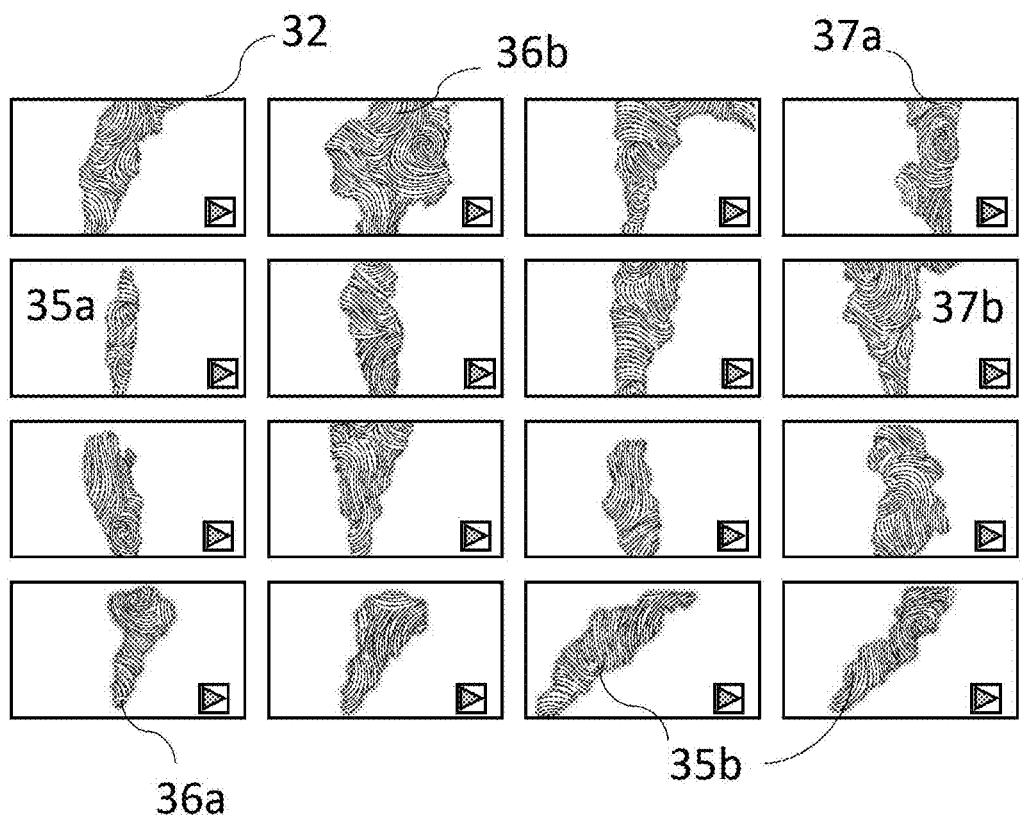
FIG. 6 is a schematic representation of an array of Video Clips showing different kinds of Plumes of Smoke, for their use in training a model for an embodiment of an AI enabled image recognition System for automated video detection of forest fires, in accordance with the present invention.

FIG. 6 represents examples of different types and sizes of Plumes of Smoke that can be used in the generation of the Dataset. Smoke-Plume-Clips 32 of varied characteristics are used to teach the Algorithm how to recognize different types of fires on their earlier stages. Stock footage of Plumes of Smoke can be used to digitally generate the sample. The Smoke-Plume-Clips 32 of FIG. 6 feature different kinds of Plumes of Smoke. Wind and no wind conditions are considered within the video options, having for example both Straight Plumes of Smoke 35a and windy Plumes of Smoke 35b. Small Plumes of Smoke 36a are ideal for early fire detection since they correspond to smaller fires. Large Plumes of Smoke 36, narrow Plumes of Smoke 37a and wide Plumes of Smoke 37b are also types of Plumes of Smoke to use in the generation of this Dataset. All of these types of Plumes of Smoke are to be digitally independently placed over the different Background-Clips 34, in each one of the nine the positions 33a-33i depicted in FIG. 5, with a relative size to the background calculated by perspective with the guidelines provided by FIG. 7 and in all the possible combinations derived from the matrix presented on FIG. 8.

FIG. 7 shows how to use perspective to appropriately scale the size of the Smoke-Plume-Clips 32 to be digitally incorporated into to a Background-Clip 34 to generate a Training-Clip 38. The distance of the Plume of Smoke is relative to the point of view. Following the location of the Smoke-Plume-Clips 32, three ranges of distance are used for scaling the Smoke-Plume-Clips 32 relative to its distance: A Lower-Range-Line 40 and an Upper-Range-Line 41 are added to the Background-Clip 34 at the beginning (first frame) of the Clip, based on the scale and perspective of the image, defining a Close-Range-Distance 42, below the Lower-Range-Line 40, a Far-Range-Distance 44 above the Upper-Range-Line 41, and a Mid-Range-Distance 43 between the Lower-Range-Line 40 and the Upper-Range-Line 41. Perspective lines are then added following the perspective of the Background-Image, which is the first frame of the Background-Clip 34. Subsequently, Close-Range-Smoke-Plume-Clips 46, Mid-Range-Smoke-Plume-Clips 47 and Far-Range-Smoke-Plume-Clips 48 are digitally added to the Background-Clip 34 in its first frame, with its scale adjusted to follow this perspective and programmed to follow the background to stay apparently "static" in the same place relative to the background for all the remaining frames of the Clip. Every Training-Clip 38 has only one Smoke-Plume-Clip 32 in it. FIGS. 5 and 7 illustrate several Smoke-Plume-Clips 32 in the same Clip just for the ease of visualization, and to show some of the different possible combinations, positions and scaling. If a Smoke-Plume-Clip 32 is added behind a hill, the digital Plume of Smoke must be cut at the horizon line.

FIG. 8. Shows a Matrix of Challenging Variables that will Maximize Learning and Precision. In it, of possible combinations of Terrain-on-Clip 49, Wind 50, Clouds 51, Smoke-Color 52, Plume-Height 53, Plume-Width 54, Height-of-Camera 55 and Visibility 56 are shown. For each of them, different Categories 57 are presented. In this example, there are 5 categories, marked A to E. The massive variety of cloud formations and their similarity to Smoke have become a lofty obstacle for visual detection software. This is addressed by incorporating multiple challenging views of varied Plumes of Smoke against varied backgrounds. The Terrain-on-Clip 49 is classified in different kinds of terrains that can be present in the Background-Clips to be analyzed. For example, the terrain can be Flat with Little Trees, Flat with Many Trees, Hills, Mountains, Valley etc.

The Wind 50 conditions can be classified in None, From Left, From Right, To Camera, Away from Camera, etc. Clouds 51 options can be, for example, None, Blue Sky, White Sky, High, Medium, or Low, while some suitable options for Smoke Color 52 are White, Light Grey, Mix White and Grey, Blue, and "Mix Blue and White". A reasonable classification for Plume-Height 53 is 10 meters, 25 meters, 50 meters, 100 meters, 200 meters, and of Plume-Width 54 is 5 meters, 10 meters, 20 meters, 30 meters and 40 meters, although other options and ranges, as well as other variables and categories, can be used without departing from the Spirit and Scope of the present invention. Different ranges of Heights-of-Camera 55 can be considered too, for example 50 m, 100 m, 150 m, 200 m and more than 200 m, as well as the Visibility-Conditions on the Background-Clip, for example less than 20 km, 20 Km, 10 Km, 5 Km and 3 Km.

The shaded rows 58 represent the raw Background-Clips to be selected while the non-shaded rows 59 represent the different templates to be created to render the Smoke-Plume-Clips on the Background-Clips to generate the Training-Clips.

The various types of Plumes of Smoke in the Smoke-Plume-Clips can be inserted into various points of view that follow the requirement Matrix of FIG. 8 or equivalent Matrixes for that purpose. A Matrix like this one allows the creation of 390,625 unique Training-Clips under distinctly different conditions. A suitable format for the Training-Clips to be rendered at is 1080*1920 px, 30 fps and .mov format. For training the A System here disclosed with the digitally generated Training-Clips combining variations of Smoke-Plume-Clips, positions, and Background-Clips, it would be:

Position 1—5 variations of Plume of Smoke—300 clips
Position 2—5 variations of Plume of Smoke—300 clips
Position 3—5 variations of Plume of Smoke—300 clips
Position 4—5 variations of Plume of Smoke—300 clips
Position 5—5 variations of Plume of Smoke—300 clips
Position 6—5 variations of Plume of Smoke—300 clips
Position 7—5 variations of Plume of Smoke—300 clips
Position 8—5 variations of Plume of Smoke—300 clips
Position 9—5 variations of Plume of Smoke—300 clips
Total Training-Clips: 2,700

However, this guideline is not limiting, and a different number and types of Training-Clips can be used without departing from the Spirit and Scope of the present invention. A suitable methodology to generate these Training-Clips is as follows:

(a) Obtaining a Library of Significantly Varied Real Fire Videos to use as Complementary-Training-Clips;
(b) Obtaining a Library of Significantly Varied Non-Fire Videos to use as No-Fire-Training-Clips; and
(c) Creating a Library of Training-Clips, combining Aerial UAV Videos (Background-Clips)+CGI Smoke Videos (Smoke-Plume-Clips) in Challenging Conditions as follows:
 a. Creating 300 15 second Background-Clips with varied landscapes;
 b. Creating Smoke-Plume-Clips, one for each scenario and different Plumes of Smoke; and
 c. Rendering the resulting Training-Clips, digitally combining each of the Background-Clips with each of the Smoke-Plume-Clips, in each one the positions and following the perspectives defined before for scaling, rendering the first frame of the Smoke-Plume-Clips in the first frame of the Background-Clips and following the movement of the camera for the remaining frames.

The largest the Dataset is, the most accurate detection will be. For this reason, the amount of video data should increase over the years.

The Computer-Vision Algorithm

An Energy Efficient/Low Complexity Computer-Vision Algorithm to use in the Wildfire Early Detection System object of the present patent application is here disclosed. Energy-efficiency and computational complexity present a big challenge. The present Computer Vision Algorithm is capable of running at the edge. It is developed as a multiplication-free Neural Network for Wildfire detection. At the same time, it utilizes Generative Adversarial Networks (GANs) in which the Discriminator of the GAN structure is used as the event detector, to achieve the following:
(a) Low Cost;
(b) Real-Time Detection;
(c) Onboard Data Processing; and
(d) Image and Video Clip Storage/Transfer Image (Detection Moment).

The Aerial Dataset to be used in the Neural Network Training is the one generated from the procedure detailed in the previous section of this Specification, or others similarly obtained without departing of its Spirit and Scope. With this Dataset, training of the Neural Network is performed with the Unique Training Set per the Following Goals:
(a) Maximize Still Image Precision: 95%+;
(b) Differentiate Clouds from Smoke with 95%+ Confidence; and
(c) Maximize Moving Platform Image Precision: 95%+.

A Control and Graphics Processing Unit commands the Camera functions and run the AI Algorithm. The ranges of operation and detection for Smoke recognition performance of the AI unit is defined with the use of a specific 30× Zoom EO Sensor and different Sensors heights above terrain.

A Discriminator Network is used to classify regular wilderness images from Wildfire images. This Discriminator Network is trained as a part of a Generative Adversarial Network (GAN) System. GANs are actually used for generating genuine looking artificial images in practice. The System here disclosed uses both the CG and GAN generated images during training. It uses only the Discriminator Network of the GAN as a classifier at the edge. To design this Discriminator, a Multiplierless Operator related with the L1 norm is used. Computational requirements of Deep Neural Networks can be formidable for mobile Systems especially from streaming video from Cameras. One route to computational efficiency is to develop Algorithms that avoid the use of multiplications. A new class of non-Euclidean L1 norm based Neural Networks called Additive-Networks (AddNet) has been recently introduced by the Department of Computer Engineering of Middle East Technical University, Ankara, Turkey and others in their paper "NON-EUCLIDEAN VECTOR PRODUCT FOR NEURAL NETWORKS" hereby incorporated by reference. The AddNet Operator replaces the multiplication Operator in Neural Networks, by mimicking the role of multiplications so that operations similar to correlations could be analogously defined. The use of such Operators used in a CNN framework yields highly encouraging results, obtaining not only a more compact CNN but also getting better classification results than traditional CNN in the presence of high noise such as the salt and pepper noise. A Convolutional Discriminator type AddNet is used for Wildfires from UAV Cameras. In this context, AddNet performs much better than binary Neural Networks.

In what follows, the additive Operator and resulting computationally efficient artificial Neural Network will be reviewed first. Afterwards, the novel additive GAN structure is introduced. The notion of a new "product" of two vectors as a binary operation involving sign, addition and subtraction operations, and maximum and minimum operations is also introduced. The new class of vector products are non-Euclidean Operators and the "product" of a vector with itself can be expressed in terms of the L1 norm of the vector.

As a result, Algorithms and methods developed using the new class of vector products will lend themselves to sparse Systems. Let x_1 and x_2 be two real numbers. Define their "product" is hereby defined as follows:

$$x1 \oplus x2 := \text{sgn}(x1 \times x2)(|x1|+|x2|) \quad (1)$$

where the sgn is the signum function (x=sgn(x)|x|) The Operator $\oplus$ basically performs an addition operation, but the sign of the result is the same as the sign of x1×x2. We call the new Operator the multiplication-free Operator (mf-op) which can also be represented as follows:

$$x1 \oplus x2 := \text{sgn}(x1)x2 + \text{sgn}(x1)x2 \quad (2)$$

The above equation is very useful to implement the Additive-Network structures based on the new vector product using Tensorflow. Let x and y be two vectors in Rd. A vector "product" based on the $\oplus$ Operator is then defined as follows, adapting the same notation as for the scalar case:

$$x \oplus y := \Sigma_i \, \text{sgn}(x_i \times y_i)(|x_i|+|y_i|), \quad (3)$$

where x=[x1, . . . , xd]T, y=[y1, . . . , yd]T∈Rd. Obviously, the new vector "product" operation, $\oplus$ does not require any multiplications. The vector "product" defined in (3) leads to a scaled version of the L1 norm:

$$x \oplus x = 2\|x\|1 \quad (4)$$

Other related Operators include $$a \oplus \uparrow b := \text{sgn}(a \times b) \max(|a|,|b|), \text{ and } a \oplus \downarrow b := \text{sgn}(a \times b) \min(|a|,|b|) \quad (5)$$

Operators $\oplus\uparrow$ and $\oplus\downarrow$ are also multiplication-free Operators. Vector products can be defined using them as well. In these cases, the vector product of a vector with itself leads to the L1 norm of the vector, $$x \oplus \downarrow x = \|x\|1 \quad (6)$$

The above family of vector "products" can be used in correlation-like operations including "Convolutional" Neural Networks. In traditional NNs neurons perform inner products to compute the correlation between the input vector with the weights of the neuron. A new neuron is defined by replacing the inner product of a classical neuron by the vector products defined above using (3). A neuron in a classical Neural Network is represented by the activation function $$f(xTw+b), \quad (7)$$

where f(.) is the nonlinear activation function, w∈Rd, b∈R are weights and the bias, respectively, and x∈Rd is the input vector. We define a new neuron by replacing the affine transform of a traditional neuron using the mf-op as follows:

$$f(\alpha(x \oplus w)+b), \quad (8)$$

where w∈Rd, α, b∈R are weights, the scaling coefficient and the bias, respectively. The Neural Network in which each neuron is represented by the activation function defined in (5), is called Additive Neural Net-work (AddNet), which is a non-Euclidean L1 norm based NN because of (4). Similarly, MaxNet and MinNet are defined using the Operators $\oplus\uparrow$ and $\oplus\downarrow$, respectively. It is proved that AddNet with linear and/or ReLU activation function satisfies the universal approximation property over the space of Lebesgue integrable functions. Most Neural Network structures including the Convolutional ones can be easily converted into an Additive-Network structures by just replacing ordinary neurons with the activation functions defined using the mf-op, or $\oplus\uparrow$ and $\oplus\downarrow$ operations without modification of the topology and the general structure of the traditional ANN. It is possible to train the AddNet using the standard back-propagation and related optimization Algorithms. The back-propagation Algorithm computes derivatives with respect to current values of parameters. Hence, the only difference in the AddNet training is the computation of the derivatives of the argument, ($\alpha(x \oplus w)+b$), of the activation function with respect to, w, $\alpha$, b, and the input, x, which can be analytically computed by taking into account the case where xi and wi are zero. In this project, the MaxNet and MinNet type NN are implemented and AddNet is compared to other related binary NNs for Wildfire detection. A total variation (TV) type regularizer is also used as a part of the cost function to force small amplitude filter coefficients to zero to reduce the size of the network.

Since L1 norm-based methods are more robust to impulsive noise compared to L2 norm-based methods the proposed framework is more robust to impulsive noise and changing environmental conditions. The robustness of the proposed mf-Operator based machine learning methods can be analytically proved. Another important feature of the AddNet structures is that they are energy efficient because multiplications consume significantly more energy compared to additions in most processors. The AddNet is implemented in a low-power processor without requiring a GPU, to save as much energy as possible in order to increase the duration of each surveillance trip.

Wildfire Smoke has no particular shape or specific feature as human faces, cars, etc. Therefore, it is more suitable to treat Smoke as an unusual event or an anomaly in the observed scene. The AddNet based Discriminator CNN will have the Generative Adversarial Network (GAN) structure. GANs are widely used to generate artificial images. A typical GAN has a generative network and a Discriminator Network. In a standard application of GAN the generator network is used to synthesize artificial images from noise vectors, and the Discriminator Network is used to train the generator. A Discriminator Network of GAN is used in the present System to distinguish regular Camera views from Wildfire Smoke. Regular video images obtained from UAVs constitute the "true" Dataset. Smoke containing image data corresponds to "fake" or "anomaly" images. The GAN is first trained with regular images and noise as in regular GANs. The Discriminator part of the GAN produces probability values above 0.5 for normal wilderness video scenes and below 0.5 for images containing Smoke and flames because Smoke and flame images are not in the training Dataset. In the second stage of training, the GAN is refined and retrained using the gradient given in (10).

In standard GAN training, the Discriminator D which outputs a probability value is updated using the stochastic gradient $$SG_1 = \nabla_{\theta_d} \frac{1}{M} \sum_{i=1}^{M} (\log D(x_i) + \log(1 - D(G(z_i)))) \quad (9)$$

where xi and zi are the i-th regular image data and noise vector, respectively, and G represents the generator which generates a "fake" image according to the input noise vector zi; the vector $\theta d$ contains the parameters of the Discriminator. After this stage the generator network G will be "adversarially" trained as in [17]. During the first round of training we will not include any Smoke or flame videos. This GAN should be able to detect Smoke and flames because Smoke images are not in the training Dataset. To increase the recognition accuracy, we will have a second round of training by fine-tuning the Discriminator using the stochastic gradient $$SG_2 = \nabla_{\theta_d} \frac{1}{L} \sum_{i=1}^{L} (\log D(x_i) + \log(1 - D(y))) \quad (10)$$

where yi represents the i-th image containing Wildfire Smoke and/or flames. Computer graphics generated images are also used at this stage. The number of Smoke image samples L is much larger than the initial training Dataset M containing regular forest and wilderness images because computer generated Smoke are added to real aerial video Datasets. In the refinement stage characterized by (10) the parameters of the generator network of GAN are updated because the generated artificial images are used in this stage of training. A Discriminator of GAN in accordance with these Specifications successfully detects the Smoke at an early stage. In the proposed GAN structure except at the last level in which a sigmoid function will be used to estimate the event probability, if the Discriminator output probability is above 0.5 for a given color image, an alert is issued, and the image and video are stored. Training the GAN using both the regular data and noise vectors zi makes the recognition System more robust compared to a regular CNN because the amount of Video Clips containing Smoke and flames will be significantly lower than regular wilderness Video Clips. The generator network will compensate the lack of large number of Smoke and flame images by producing "unusual" images. Therefore, the Discriminator Network will not overfit to the training Dataset.

The software developed for this task takes advantage of the temporal Smoke motion, using motion vectors of pixels. In a video captured from a UAV the motion vectors follow the trajectory of the UAV. Whenever there is Wildfire Smoke the motion vectors appear to move in random directions. A motion vector image must then be generated and fed to the GAN as a fourth dimension.

Wildfires rarely start at night, but the light due to flames are very easy to detect using a regular Camera.

Figure 9:
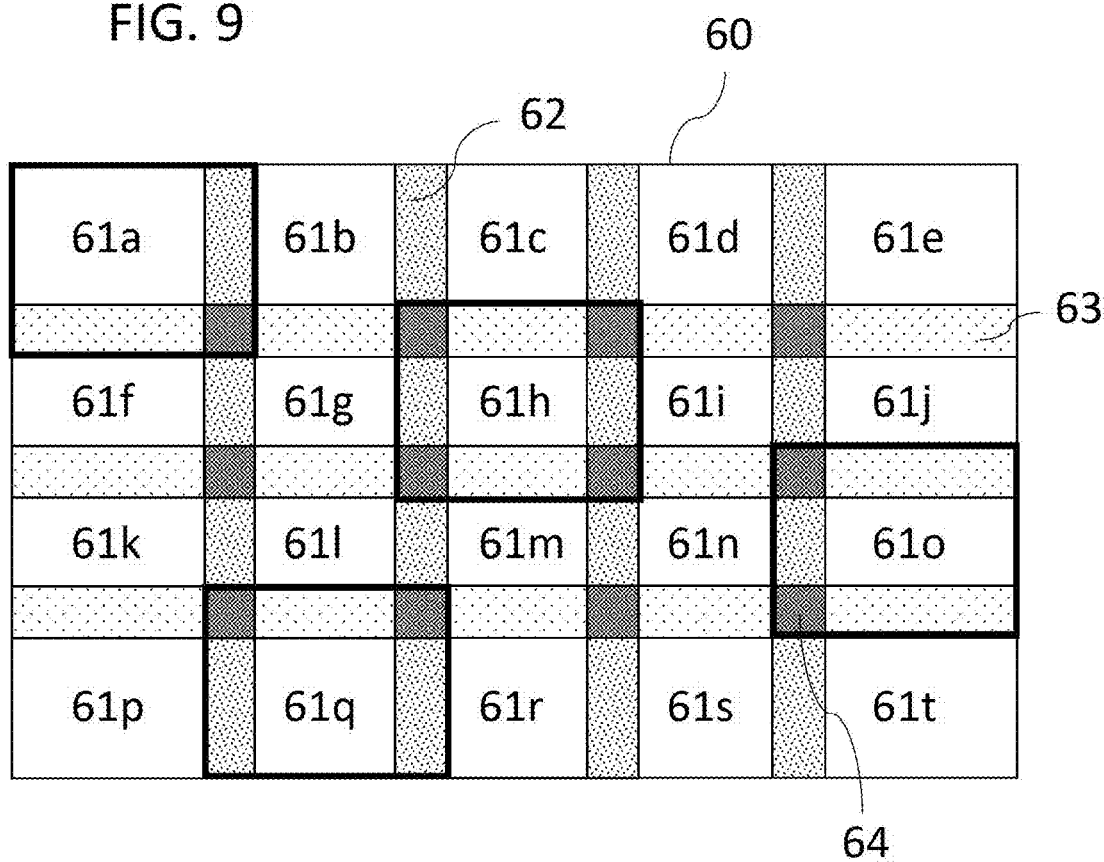
FIG. 9 is a schematic representation illustrating the functioning of Block-based detection in an embodiment of an AI enabled image recognition System for automated video detection of forest fires, in accordance with the present invention.

A further advantage of the present System is illustrated by FIG. 9, which shows how Block-based detection can be used to increase the Computer Vision System's effectiveness. A frame 60, corresponding to an Aerial Footage Video Clip (Analyzed-Clip), is divided in many Blocks. In the example shown in the figure, it is divided in 20 Blocks 61a to 61t, by following a 5×4 "grid" (in a general sense) in which this grid is configured in such a way that the Blocks are divided with overlapping, so if the Smoke happens at the edge of one Block, it will also exists at its neighbor Block. Overlapping between Blocks can be a lateral-overlapping-section 62 (like when a section as the right half of one Block overlaps with a section at the left half of its right neighbor Block), a vertical-overlapping-section 63 (like when a section at the upper half of one Block overlaps with a section at the bottom half of its upper neighbor Block) and a corner-overlapping-section 64 (like when a section at the upper-right quarter of one Block overlaps with a section at the bottom-left quarter of its upper-right neighbor Block). To clarify the edges of the Blocks and the overlapping section, four different Blocks, 61a, 61q, 61h and 61o, have been marked with heavy lines in the figure. Block 61a is a Corner-Block, at the upper-left corner of frame 60. This example frame has other three Corner-Blocks: 61p at the bottom-left, 61e at the top-right and 61t at the bottom-right. Corner-Blocks have one lateraloverlapping-section 62, one vertical-overlapping-section 63 and one corner-overlapping-section 64. In the case of Block 61a, it has a lateral-overlapping-section 62 with its neighbor at its right, 61b, a vertical-overlapping-section 63 with its neighbor at its bottom, 61f, and a corner-overlapping-section 64 with its neighbor at its bottom-right 61g.

Block 61q is a Horizontal-Border-Block, at the bottom border of frame 60. This example frame has other five Horizontal-Border-Blocks: 61r and 61 also at the bottom border of frame 60 and 61b, 61c and 61d at the top border of frame 60. Horizontal-Border-Blocks have two lateral-overlapping-sections 62, one vertical-overlapping-section 63 and two corner-overlapping-sections 64. In the case of Block 61q, it has a lateral-overlapping-section 62 with its neighbor at its right, 61r, another lateral-overlapping-section 62 with its neighbor at its left, 61p, a vertical-overlapping-section 63 with its neighbor at its top, 61l, a corner-overlapping-section 64 with its neighbor at its top-left 61k and another corner-overlapping-section 64 with its neighbor at its top-right 61m.

Block 61o is a Vertical-Border-Block, at the right border of frame 60. This example frame has other three Horizontal-Border-Blocks: 61j also at the right border of frame 60 and 61f and 61k at the left border of frame 60. Vertical-Border-Blocks have one lateral-overlapping-section 62, two vertical-overlapping-sections 63 and two corner-overlapping-sections 64. In the case of Block 61o, it has a lateral-overlapping-section 62 with its neighbor at its left, 61n, a vertical-overlapping-section 63 with its neighbor at its top, 61j, another vertical-overlapping-section 63 with its neighbor at its bottom, 61t a corner-overlapping-section 64 with its neighbor at its top-left 61l and another corner-overlapping-section 64 with its neighbor at its bottom-left 61s.

Finally, Block 61h is a Center-Block. This example frame has other five Center-Blocks: 61g, 61i, 61l, 61m and 61n. Center-Blocks have two lateral-overlapping-sections 62, two vertical-overlapping-sections 63 and four corner-overlapping-sections 64. In the case of Block 61h, it has a lateral-overlapping-section 62 with its neighbor at its left, 61g, another lateral-overlapping-section 62 with its neighbor at its right 61l, a vertical-overlapping-section 63 with its neighbor at its top, 61c, another vertical-overlapping-section 63 with its neighbor at its bottom, 61m a corner-overlapping-section 64 with its neighbor at its top-left 61b, a second corner-overlapping-section 64 with its neighbor at its top-right, 61d, a third corner-overlapping-section 64 with its neighbor at its bottom-left 61l, and a forth corner-overlapping-section 64 with its neighbor at its bottom-right 61n. The area of the lateral and vertical overlapping sections can go anywhere from 0.1% to 50% of the area of the Blocks. This grid has been shown with 20 Blocks (5×4) as an example only, but a frame 60 can be divided in any number of Blocks, as decided by the user in consideration of the desired precision and the available resources, to perform the Smoke Detection AI. For example, an ideal number would be a grid of 12×6 (72 Blocks) for a 1080*1920 px frame.

The Smoke is detected Block by Block, running the AI in all of them at the same time. Thus, the detection unit exists in every part of the frame, even at the edge. Also In this way, the Smoke has significantly lesser chances of being missed. On the other hand, previous developments do not do similar processing. They can get high accuracy if the Smoke exists at the center of the frames, but if the Smoke happens at the edge, their accuracy will decrease rapidly.

The description as set forth is not intended to be exhaustive or to limit the invention to the precise form disclosed. Many modifications and variations are possible in light of the teachings above without departing from the Spirit and Scope of the forthcoming claims.

The invention claimed is:

1. A Wildfire Early Detection System comprising:
at least one Hardware Network Component comprising one of (a) a Drone; (b) a Tethered Aerostat; (c) a Tower, or (d) a Manned Aircraft, wherein said Hardware Network Component is equipped with:
one or more Cameras comprising: an RGB, Near Infrared (Night Vision) or thermal Camera, wherein the one or more Cameras are configured to provide Aerial Video Clips of surveilled areas; and
an AI-Enabled Embedded Computer configured to train a Computer-Vision Algorithm with an Aerial Training Dataset comprising at least 324,000 Training Clips obtained by combining and digitally placing at least 300 Smoke-Plume-Clips having at least 5 variations of Smoke-Color, Plume-Height and Plume-Width in at least 120 Background-Clips having at least 5 variations of Terrain-on-Clip, Clouds, Height-of-Camera and Visibility, wherein said Smoke-Plume-Clips are digitally placed in nine different positions in a first frame of said Background-Clips with a relative size to a background calculated by perspective and programmed to follow the background to stay apparently "static" in the same place relative to the background for all remaining frames of the Clip;
wherein the trained Computer-Vision Algorithm is used to recognize early fire Plumes of Smoke in said Aerial Video Clips.

2. The Wildfire Early Detection System of claim 1 wherein Camera functions are controlled from a web app and from the Embedded Computer, and wherein said Camera and Said Embedded Computer are powered by solar panels, and configured to operate autonomically 24/7.

3. The Wildfire Early Detection System of claim 2 wherein said Camera and Said Embedded Computer have a Power Consumption between 20W and 60W.

4. The Wildfire Early Detection System of claim 1 wherein at least one of said Hardware Network Components is a Tethered Aerostat made of PVC and filled with Helium, and having an airfoil shape that stabilizes Roll, Pitch and Yaw axes, and having a lift vs drag ratio that tends to infinity so that a Tether and ground form an angle of between 80 and 100 degrees wherein area to volume ratio is of at most 3.5 $m^2/m^3$.

5. The Wildfire Early Detection System of claim 4 wherein said Tethered Aerostat further comprises an Automatic Helium Filling Valve used to refill the Aerostat with Helium in case of low pressure while said Aerostat is on air, wherein said Automatic Helium Filling Valve comprises the Tether, an Upper-Ring acting as a male connector, which is attached to the Tether in such a way that it allows the passage of Helium from the Valve to the Aerostat through an Upper-Pipe, a Non-Return-Valve added to the Upper-Pipe, a Lower-Ring acting a female connector, that is attached to a ground unit containing a Helium Cylinder, wherein the Lower-Ring has a lower pipe which connects said Lower-Rong to said Helium Cylinder and wherein when the Upper-Ring and the Lower-Ring are connected together, they are sealed by a Rubber-Seal to make sure there are no leaks.

* * * * *